July 10, 1928.

F. W. STALKER

GAUGING INSTRUMENT

Filed March 28, 1925   3 Sheets-Sheet 1

Inventor
Frederick W. Stalker
By Frederick F. Church
his Attorney

July 10, 1928.  F. W. STALKER  1,676,673
GAUGING INSTRUMENT
Filed March 28, 1925   3 Sheets-Sheet 2
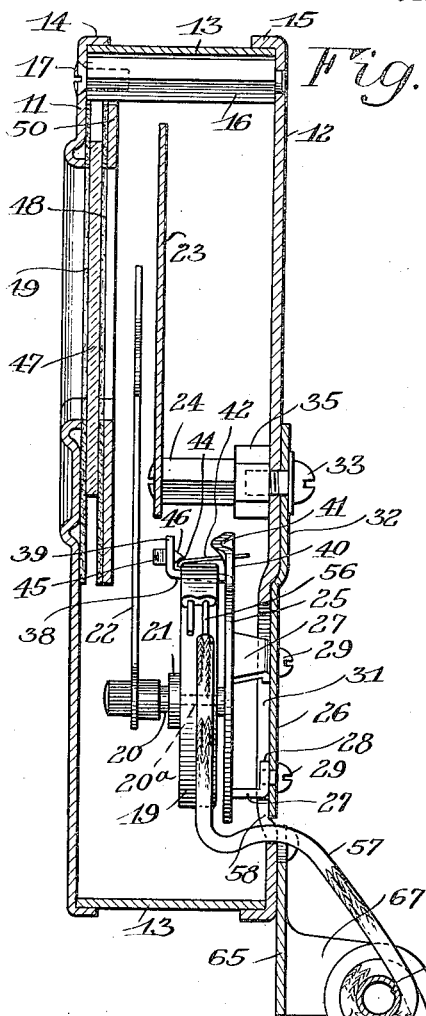
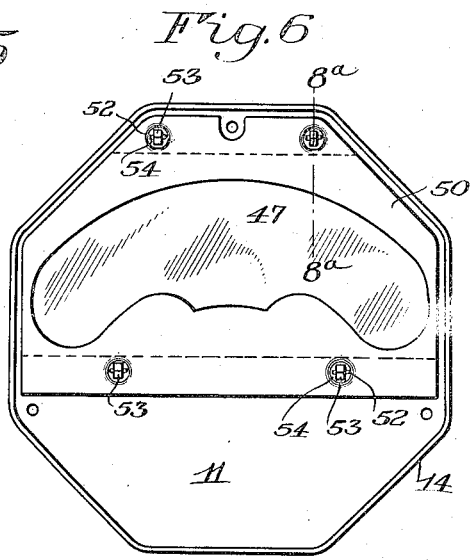
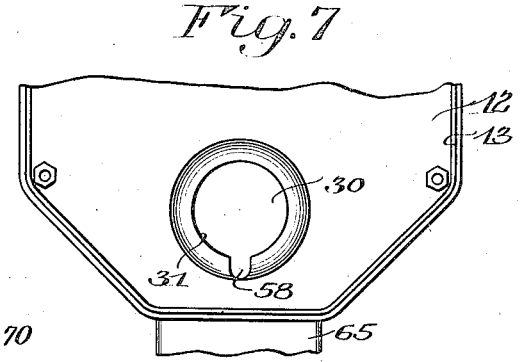
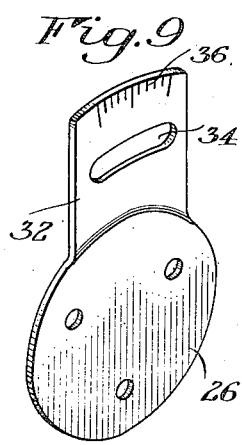
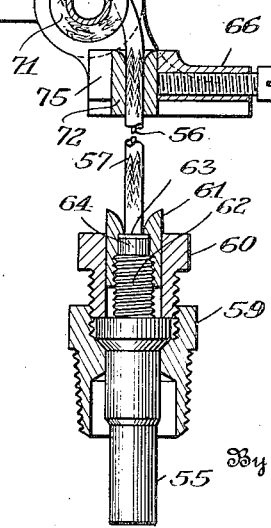
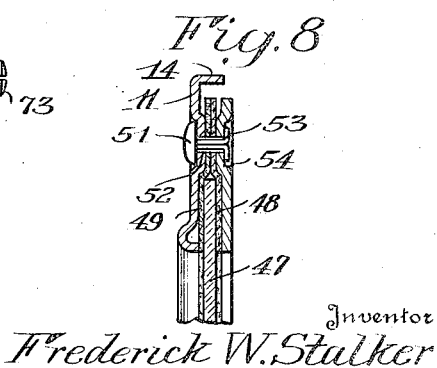
Inventor
Frederick W. Stalker
By Frederick F. Church
his Attorney

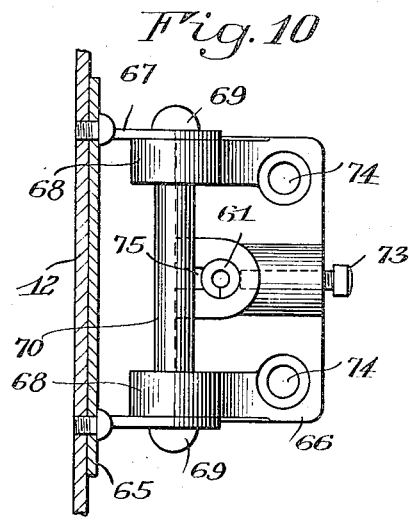
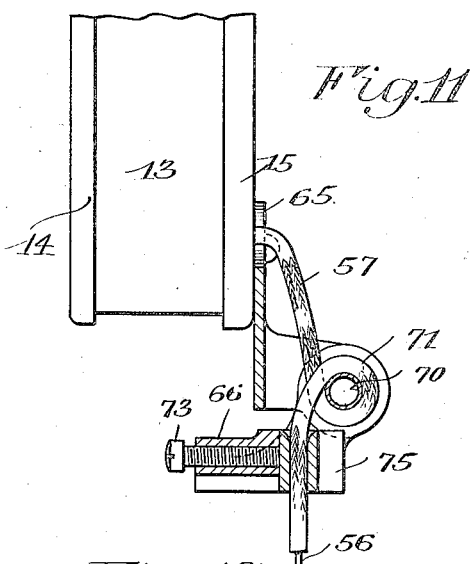
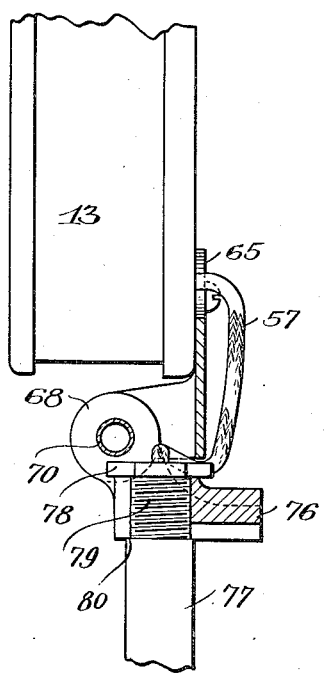
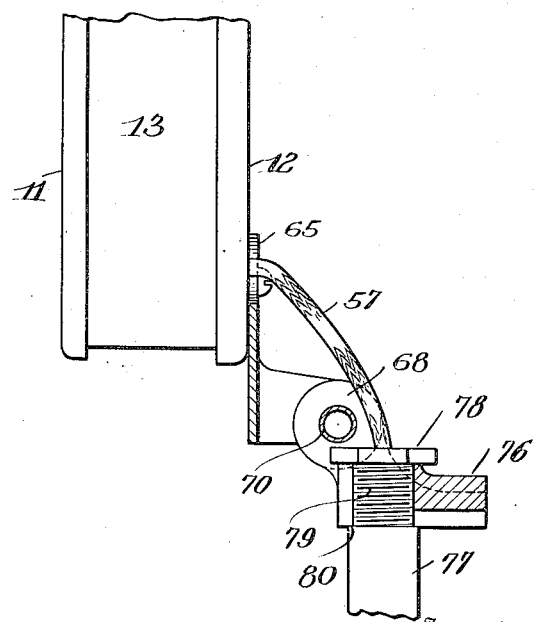

Patented July 10, 1928.

1,676,673

UNITED STATES PATENT OFFICE.

FREDERICK W. STALKER, OF ROCHESTER, NEW YORK, ASSIGNOR TO TAYLOR INSTRUMENT COMPANIES, OF ROCHESTER, NEW YORK, A CORPORATION OF NEW YORK.

GAUGING INSTRUMENT.

Application filed March 28, 1925. Serial No. 18,956.

The present invention relates to gauging instruments, and has for its object to provide improvements which are advantageous in connection with different types of indicating instruments but more particularly that class of gauging instruments wherein the desired indications are afforded through the medium of one or more elements responsive to changes in temperature or pressure, either at points adjacent to or remote from the dial or chart upon which the indications are made.

A further object of the invention is to provide improved means for supporting and regulating the position of an indicating device from the exterior of its casing without removing any of its parts, whereby the same may be conveniently and accurately adjusted with relation to a chart or scale from time to time as may be required.

A further object of the invention is to provide an improved form of mounting for an indicating instrument which will increase its usefulness by extending the scope of its installation requirements, and at the same time render it conveniently accessible to facilitate reading, regardless of the type of equipment with which the instrument may be employed.

A further object of the invention is to provide a pressure gauge or indicating instrument of the type controlled by a capillary tube system with improved means permitting angular adjustment of the instrument but without injury to the tube by reason of undue strain or tension thereon during adjustment of the instrument from one position to another.

Still another object of the invention is to provide an indicating instrument, including a capillary tube and bulb, with an improved rigid form of support for the same and further to provide various improved forms of construction and arrangements of parts which will afford an instrument of the kind desired that is durable and efficient as well as economical to manufacture and convenient to install and which is adapted for use in various branches of industry.

To these and other ends the invention resides in certain improvements and combinations of parts, all as will be hereinafter more fully described, the novel features being pointed out in the claims at the end of the specification.

In the drawings:—

Figure 5 is an enlarged transverse sectional elevation taken on line 5ª—5ª of Figure 1;

Figure 6 is a rear elevation of the front cover for the instrument;

Figure 7 is a fragmentary elevation showing the front face of the lower half of the rear cover;

Figure 8 is a sectional elevation taken on line 8ª—8ª of Figure 6;

Figure 9 is a detail perspective view of an adjustable plate for supporting the bracket shown in Figure 4;

Figure 10 is a plan view partly in section of the adjustable bracket construction shown in Figure 5 by which the instrument is supported;

Figure 11 is a sectional elevation showing the lower portion of the bracket in reverse position from that shown in Figure 5;

Figure 12 is a view similar to Figure 11 showing the upper half of the bracket reversed and illustrating a modified lower bracket section having a rigid depending bulb support and Figure 13 is a view similar to Figure 12 with the brackets shown reversed.

Similar reference numerals throughout the several views indicate the same parts.

Figure 1:
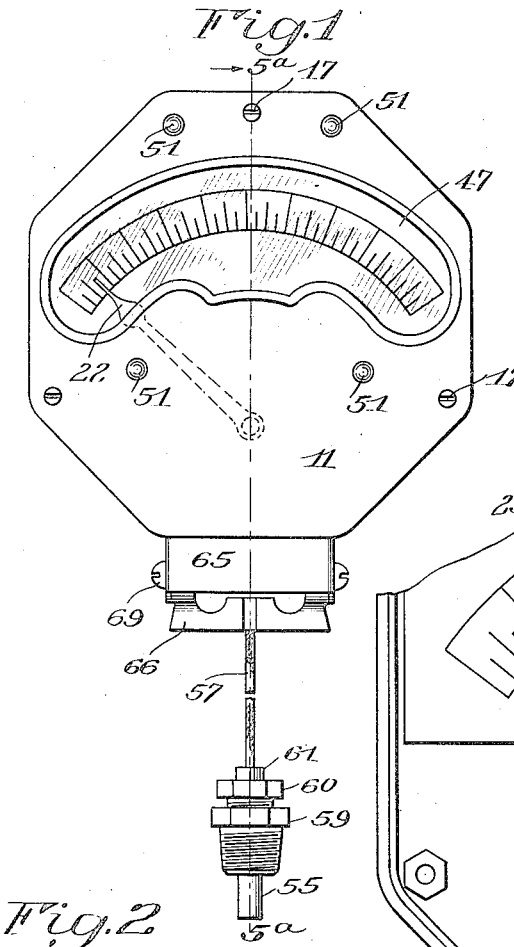
Figure 1 is a front elevation of an instrument embodying one form of the invention.
Figure 4:
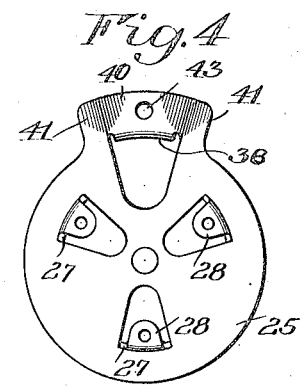
Figure 4 is a rear elevation of a bracket for supporting the Bourdon tube and indicating hand.
Figure 3:
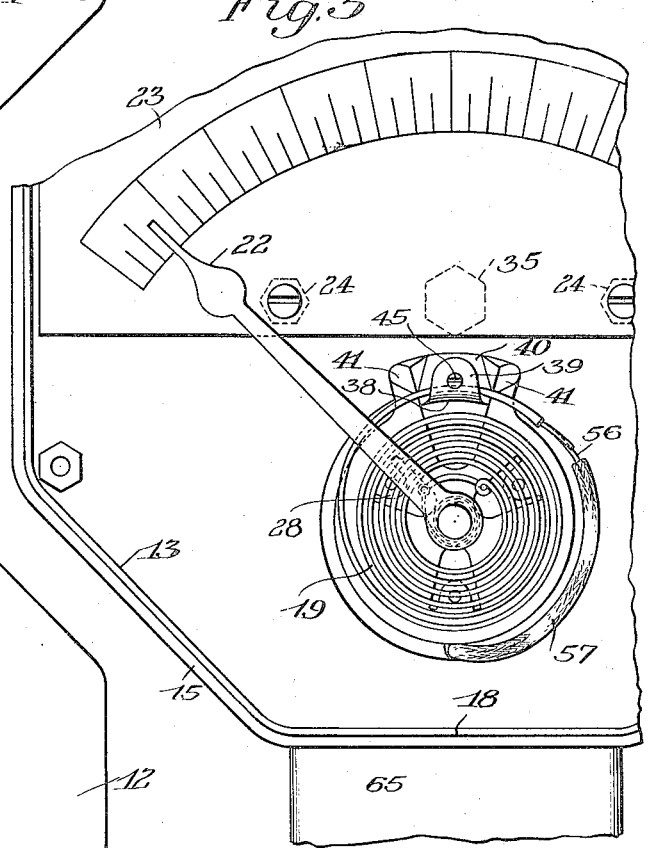
Figure 3 is an enlarged fragmentary elevational view looking at the front of the instrument with the cover removed to illustrate the indicating mechanism.

The invention as illustrated in the drawings embodies preferably an octagonal shaped frame or casing 10 for enclosing the indicating mechanism and includes front and rear frame or end cover members 11 and 12, respectively, and an intermediate body member 13. The body member is removably clamped between the end members, the latter having inturned flanges 14 and 15 engaging the outer peripheral face of the body portion, the connection between the front and rear members being preferably made by means of suitable studs or posts 16 permanently secured at their rear ends to the cover member 12 and carrying screws 17 at their front ends by which the cover plate 11 is clamped upon the body member. The body member is preferably formed from a sheet metal strip shaped as shown and having its ends unconnected as indicated at 18, thus affording a relatively cheap construction which is held in position by the flanges 14 and 15 without requiring additional securing means, whereby the body member may be quickly removed upon removal of the screws 17.

The indicating mechanism may be of any preferred or well known type, but preferably embodies a temperature or pressure sensitive element, such as a Bourdon tube 19, coiled about a sleeve 20 rotatably disposed on a shaft or arbor 20ª and connected with the sleeve preferably by a spring 21 which serves to hold a pointer 22 secured upon the sleeve at zero position with respect to a suitable scale or dial member 23. The dial member is carried by spaced posts or studs 24 which are suitably connected with the rear cover or frame member 12. A bracket or holder 25 of novel construction forms a suitable support for the Bourdon tube and parts associated therewith including the arbor 20ª. In conjunction with the bracket I provide an adjustable plate or holder 26 on the outside of the frame or cover member 12 to form a unitary support for the indicating mechanism. The bracket embodies a plate member having rearwardly extending arms 27 struck outwardly from the plate and provided with inwardly turned projections 28 seated upon and removably secured to the plate 26, as by the screws 29. The arms project into an opening 30 of the cover 12 and are adapted to have a bearing on the cover preferably upon the surface 31 thereof to rotatably support the bracket. Upon rotation of the plate 26 the indicating mechanism carried by the bracket will be bodily rotated, whereby the pointer or indicating hand 22 may be adjusted to zero position either at the time of construction of the instrument or at such times during the use thereof as may be required due to deviations of the pointer from the normal position which may result from different causes. This construction makes it unnecessary to remove the indicating mechanism from the casing and obviates having to vary the position of the pointer with respect to the rest of the mechanism. The arrangement therefore permits the indicating mechanism to be rotated about the axis of the arbor 20ª or the pivotal axis of the pointer since the arms 27 are rotatably disposed within the opening 30 of the cover or frame member 12. The cover is preferably recessed to receive the bracket supporting plate 26, thereby affording additional means for holding the bracket properly centered. The plate 26 is preferably provided with an offset extension 32 by which it may be more conveniently rotated, the plate being clamped in the desired position of adjustment by means of a screw 33 projecting through an arcuate slot 34 in the extension 32 and threaded into a nut or boss 35 on the inner face of the cover 12. Adjustment of the plate may be readily effected upon slightly loosening the screw, as will be understood. The extension 32 is preferably provided with a scale at its upper end as indicated at 36 for cooperation with a suitable mark on the back of the cover 12 as indicated at 37, the parts being preferably designed with the idea that when the pointer is at zero position the center of the scale and the slot 34 will be in registry with the mark 37, thus allowing for ample adjustment of the pointer regardless of which side of the zero point the deviation may occur.

The bracket 25 not only affords a support for the arbor or pivot member 20ª upon which the sleeve 20 is mounted, but is also provided with a novel form of retaining means for the Bourdon tube 19. This is in the form of a tongue or finger 38 struck outwardly from the body of the bracket, at substantially a right angle thereto and provided with an angular portion 39 extending substantially parallel with a laterally projecting portion 40 of the bracket which is strengthened by offsetting or ribbing its sides as indicated at 41.

The Bourdon tube 19 which is of flattened construction is clamped upon the outer face of the finger 38, preferably by a wedge shaped key 42, the smaller end of which is projected through an opening 43 in the portion 40 of the bracket and retained by the latter while the larger end is provided with an angularly disposed lip 44 adapted to overlie the edge of the Bourden tube as shown in Figure 5. A screw 45 is threaded through the portion 39 of the finger and has a beveled end 46 adapted to engage the inclined lip 44 of the key to clamp the tube upon the finger 38 whereby to firmly hold it in the desired position. This arrangement forms a quickly detachable and comparatively inexpensive means for securing the tube upon the bracket.

Novel means has been provided for securing the glass or transparent member 47 through which the pointer 22 and scale 23 are viewed. The glass is disposed between inner and outer pads or flexible plates 48 and 49, respectively, the latter being disposed upon the inner face of the front cover 11 and the former on the front face of a suitably shaped retaining plate 50 as best shown in Figure 8. The plate 50 is securely held by a suitable number of fastening devices 51 which are preferably in the form of paper clips extended through the front cover 11, and through the pads 48 and 49 and the longitudinal slots 52 in the plate 50 upon which the extremities 53 of the clips are bent back preferably within annular recesses 54 formed in the rear face of the plate.

A temperature responsive actuating member 55, preferably in the form of a fluid holding bulb is disposed at the outer end of a transmission member 56, such as a flexible capillary tube, which is connected with the pressure responsive element 19, the latter serving to actuate the pointer 22 or other suitable indicating member in a manner well understood in the art. The transmission member 56 is provided with a flexible covering 57 constructed in any approved manner and extended into the casing through an opening 58 in the rear cover 12 at the base of the opening 30 as shown in Figure 7.

The extended transmission member 56 is employed where it is desired to place the indicating means at a point remote from the location or body, the temperature of which it is desired to ascertain, as in certain industrial processes. The bulb 55 may be provided with any approved supporting means suitable for connecting it with a pressure tank, such as the externally threaded plug 59 through which the bulb projects and within which it is held by a threaded member 60 sleeved upon a cap 61 into which is threaded an extension 62 on the bulb, the cap being adapted to clamp a flared portion 63 of the covering 57 upon the reduced end 64 of the extension 62 as shown in Figure 5.

Figure 2:
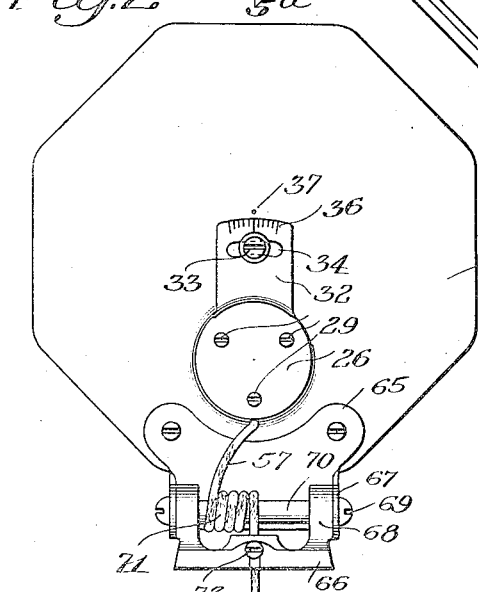
Figure 2 is a rear elevation of the same.

The mounting for the casing as shown in Figures 1, 5 and 10 embodies upper and lower bracket members 65 and 66, respectively, the former being suitably connected, preferably with the rear cover 12 and having rearwardly extending arms 67 between which are disposed the upstanding arms 68 of the base member 66, said bracket members being pivotally connected in a suitable manner preferably by screws 69 extending through the arms 67 and threaded into the lugs or arms 68. The screws 69 are extended through the lugs 68 far enough to form a support for a tubular member 70 which is preferably free to rotate upon the ends of the screws and which forms a suitable support around which the flexible transmission member is coiled as indicated at 71 in Figures 2 and 5. The transmission member is extended through a split bushing 72 disposed within a slot formed in the lower bracket member 66, the bushing being clamped upon the flexible transmission tube by means of a screw 73 threaded within the bracket member as shown in Figure 5. This construction permits a number of complete turns of the flexible capillary tube to be wound upon the member 70 whereby to permit angular adjustment of the instrument upon the support to facilitate reading of the dial without any undue strain or tension on the capillary tube. The bracket member 66 is provided with holes 74 for the reception of bolts or screws by which it may be conveniently secured upon a suitable support, not shown. It is also cut away or slotted at 75 to facilitate its removal from the flexible tube after the bushing 72 has been withdrawn from the bracket. The bracket 66 may be assembled in either a forward or reverse position, as shown in Figures 11 and 5, respectively, whereby the instrument is adaptable to different requirements of installation.

In Figures 12 and 13 a modified form of lower bracket construction is shown, the upper bracket 65 being the same as that shown in Figures 1 and 5 but extended forwardly in one case and reversely in the other. The modified lower bracket, indicated generally at 76 in Figures 12 and 13 is substantially of the same outline and proportions as the one shown in Figure 5 with the members 72 and 73 omitted. This form of bracket is adapted for connection with a rigid bulb support such as the pipe or tube indicated at 77 which may be of any length desired and suitably constructed at its lower end to receive a bulb preferably of the type shown in Figure 5. The bulb support 77 is secured upon the bracket 76 by a nut 78 on a threaded portion 79 of the support which is made slightly smaller than the body portion thereof to form a shoulder 80 upon which the bracket is clamped by tightening the nut 78. The capillary tube 67 is adapted to extend through the support 77 to the bulb with which it is connected in a suitable manner not shown.

In Figure 12 the upper bracket is shown in forward position and the lower bracket in reverse position, while in Figure 13 both are shown in reverse position. This form of construction is readily adaptable for different installation requirements and permits the instrument to be quickly adjusted upon its pivot to facilitate reading of the dial. The rigid bulb support 77 is adapted for insertion within a liquid holding tank or receptacle of any kind where it is desired to ascertain the temperature of its contents, though it is not limited to this particular usage.

While the invention as illustrated in the drawings is suitable for accomplishing the results desired, it will be understood that changes in the form, proportions and arrangement of parts may be made within the scope of the claims without departing from the spirit of the invention as expressed therein.

I claim as my invention:

1. In a gauging instrument, the combination of a casing having an opening through its wall, indicating mechanism disposed within the casing, a holder for said mechanism, a support for the holder, connected therewith through said opening and rotatably disposed upon the outer wall of the casing, an operating extension upon the support arranged to cooperate with the casing to indicate different positions of adjustment of said mechanism and means for securing the support in the desired position upon the casing.

2. In an instrument of the character described, the combination of a casing having an aperture in its rear wall, a plate disposed on the outer surface of said wall for movement about a fixed axis of rotation, means for adjustably securing the plate to the wall and indicating mechanism including a pointer, mounted as a unit on the inner surface of said plate, the pointer and the said plate having substantially the same axis of rotation.

3. In an instrument of the character described, the combination of a casing having an inwardly depressed circular portion in its rear wall and an aperture therethrough, a substantially circular plate disposed on the outer surface of said depressed portion for rotation about the axis thereof, indicating mechanism, including a pointer, mounted as a unit on the inner surface of the said plate, means on the plate for turning it on its axis and means for adjustably securing the plate to the wall of the casing.

4. In an instrument of the character described, the combination of a casing having an inwardly depressed circular portion in its rear wall and an aperture therethrough, a substantially circular plate disposed on the outer surface of said depressed portion for rotation about the axis thereof, indicating mechanism including a pointer, mounted as a unit on the inner surface of the said plate, an arm extending from the plate, formed to be in sliding contact with the outer surface of the casing, and a connection between the arm and the casing for adjustably securing the former to the latter.

FREDERICK W. STALKER.